Figure 1:
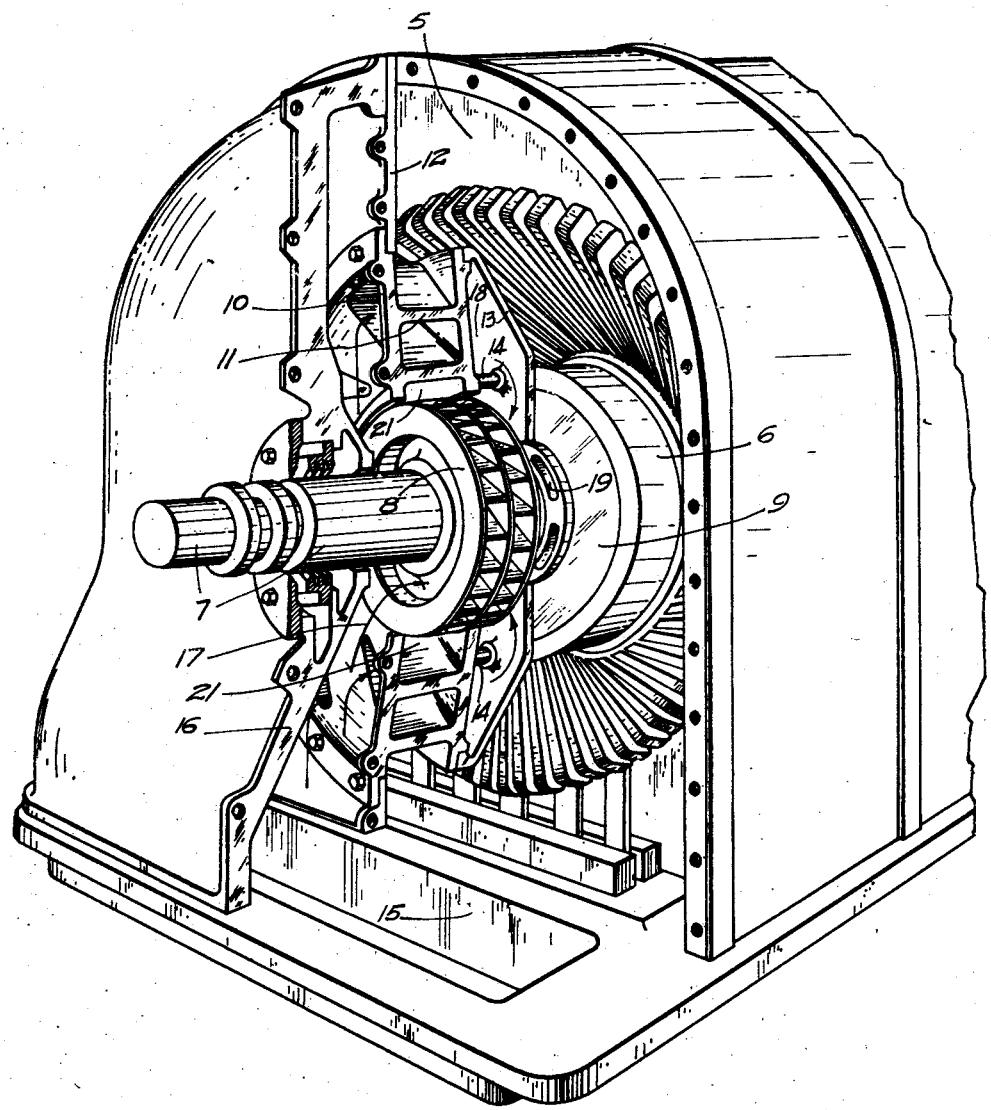

Sept. 29, 1931.  M. D. ROSS  1,824,839
VENTILATION OF DYNAMO ELECTRIC MACHINES
Filed Dec. 7, 1928  2 Sheets-Sheet 1

INVENTOR
Malcolm D. Ross.
BY
ATTORNEY

Sept. 29, 1931.   M. D. ROSS   1,824,839
VENTILATION OF DYNAMO ELECTRIC MACHINES
Filed Dec. 7, 1928   2 Sheets-Sheet 2
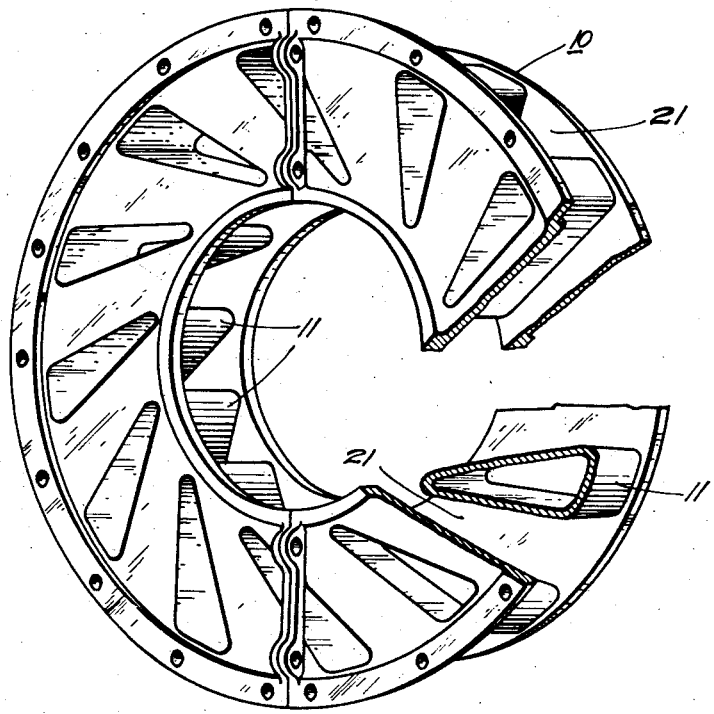
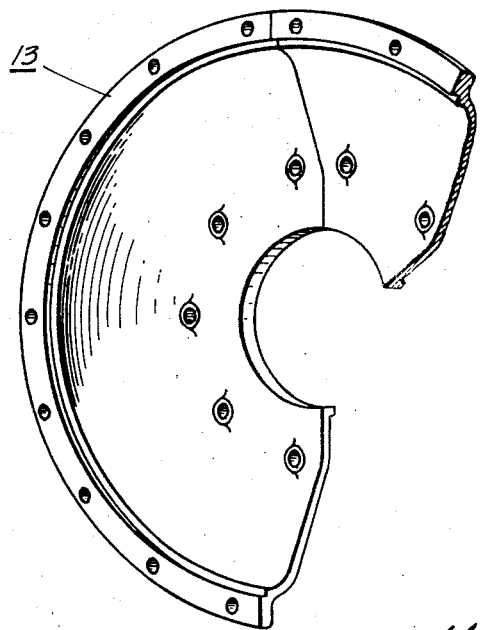
INVENTOR
Malcolm D. Ross.
BY
ATTORNEY Patented Sept. 29, 1931

1,824,839

UNITED STATES PATENT OFFICE

MALCOLM D. ROSS, OF PITTSBURGH, PENNSYLVANIA, ASSIGNOR TO WESTINGHOUSE ELECTRIC & MANUFACTURING COMPANY, A CORPORATION OF PENNSYLVANIA

VENTILATION OF DYNAMO ELECTRIC MACHINES

Application filed December 7, 1928. Serial No. 324,460.

My invention relates to dynamo-electric machines, and more particularly to the ventilation of large turbine generators.

In turbine generators of relatively small ratings, it is possible to build centrifugal fans which will deliver the required pressure and volume of air since there is sufficient area between the inner edge of the fan blades and the shaft to allow an adequate amount of air to enter the fan. In machines which approach the maximum in rating, at any given speed, the available section for air to enter the fan becomes limited, and the entrance velocities become high, with a consequent reduction in efficiency. The diameter of the shaft cannot be reduced a great deal beyond a certain point, because of the limitations as to stiffness, critical speed and other design considerations; and the fan diameter cannot be increased beyond a certain point because it is limited by stresses caused by rotation. It has been, therefore, impossible, heretofore, to provide machines above a certain rating with internal fans.

For machines of maximum rating, it has been customary to utilize separate, motor-driven fans, but where these have been utilized, it has been found desirable to connect the fan motors to the terminals of the generator, so that, as soon as the voltage is built up on the generator, the ventilating fans will automatically start. If this method is employed, the breaker for protecting the fan motors must be capable of interrupting the short-circuit current of the generator in case of failure of the fan motor, and, as a result, the control equipment for separately driven fans becomes expensive.

If the ventilating fan-motor is driven through a transformer, or through some source of supply other than the generator with which it is to function, there is also a possibility that the generator may be run without any ventilating air from the fan. In addition, motor-driven fans take up valuable space in the power house, whereas the internal fans require little extra floor space.

In the design of internal fans for machines having ratings near the maximum, it has been found that single-entrance centrifugal fans which are attached to the rotor end-plates have to be made with the diameters of the fans larger than that which would give the best efficiency, in order to provide sufficient section for air to enter the fan near the shaft. As a result, the operating efficiency of some of the largest single-entrance fans is probably not more than 25%. The separate motor-driven fan has an efficiency of 60 to 70%, which gives this fan a considerable advantage over internal fans. The problem has been, therefore, to improve the efficiency of the internal fan, as it is less costly than the separate external fan, occupies less space, and is more often preferred in the field.

It is, an object of my invention to provide a turbine generator of maximum rating, with an internal fan arrangement which is more efficient than fan arrangements utilized heretofore.

It is another object of my invention to provide a turbine generator of maximum rating with a means whereby a fan of the double-entry type may be utilized, whereby greater entrance area for the air entering the fan is obtained, by thus bringing in the air from both sides of the fan, the volume of air is approximately doubled.

In accordance with my invention, a double-entry fan is utilized, instead of a fan that is attached to the rotor end-plate, as utilized heretofore, and is mounted on the shaft, at some distance from the rotor end-plate, in order to provide an opening for the air to enter the inner half of the fan.

Surrounding the fan is a stationary diffuser having hollow blades, which provide for the entrance of the air into a chamber formed by the diffuser and an inner wall, from which the air is drawn into the inner side of the fan. The hollow blades of the stationary diffuser are so shaped as to expand the air, which leaves the fan at a relatively high velocity, down to a low velocity, and thus recover the energy which would otherwise be lost in a fan with an open discharger. The fan-diffuser increases the efficiency of the double-entry fan to about 50% maximum efficiency, as against about 37% for the fan without a diffuser.

For a better understanding of my invention, reference may be had to the accompanying drawings, in which Figure 1 is a perspective view of a turbine generator having one-half of its end bell removed, and showing my invention, Fig. 2 is a perspective view of the stationary diffuser provided with hollow blades, and Fig. 3 is a perspective view of the inner wall which is employed, in conjunction with the diffuser, to provide an inner chamber from which air is drawn into the inner half of the fan.

In Fig. 1, is illustrated a turbine generator having a stator member 5 and a rotor member 6 with a shaft 7 on which is mounted a fan 8 which has two entrances, one on each side, and which is spaced from the rotor end-plate 9. The fan is surrounded by a stationary diffuser 10 having hollow blades 11, and preferably made in halves, for convenience in assembly. The air from the fan is discharged into the diffuser and thence into the machine casing, the diffuser being supported from the stator frame by means of an annular plate 12, which, with the diffuser 10, thus constitutes an end-bell for the machine. The diffuser is joined to the outer periphery of a depending inner wall 13 which in order to prevent vibration thereof, is also secured at its inner periphery by stud bolts 14.

The air enters the machine at the base, through an opening 15 which leads into an end-chamber provided by an outer end-bell 16. Part of the air then enters the fan 8 axially, from the outer sides, through the space between the inner periphery of the fan blades and the shaft, as indicated by the arrow 17; while part of the air passes to the inner side of the fan, by way of the hollow blades 11 and the chamber 18, which is formed by the inner wall 13.

A portion of the air may be by-passed, from the inner chamber 18, without passing through the fan 8, by being drawn directly into the rotor member, by reason of the centrifugal fan-action in the radial ventilating ducts within the rotor, for which purpose, passage-ways 19 are provided at the end of the rotor member leading off from the inner chamber 18. The air, leaving the fan 8, is thrown into the diffuser spaces 21 between the blades, where it is expanded, so that it leaves the diffuser with a velocity much lower than the entrance velocity.

The air, upon entering the machine, has a substantial pressure, sufficient to effect its passage through the axial and radial passage-ways of the stator, and through the air gap, to a point midway in the machine, and then may leave through the base. A similar fan-arrangement disposed at the opposite end of the machine will serve to ventilate the other half of the machine, and the air may be discharged through the same middle opening in the base.

The diffuser, in the present invention, may be cast or be composed of structural parts, and further, it may be made in a single part, but is preferably made in two halves, as shown in the figures.

From the foregoing description and explanation, it will be perceived that I have provided means whereby the fan, in a large turbine generator, will deliver the required pressure and volume of air with maximum fan-efficiency and at relatively low entrance velocities. The means, just referred to, for obtaining the desirable results mentioned, consist principally in the hollow stationary diffuser blades which perform the double function of carrying air to the inner side of the fan and expanding the air leaving the fan so that high efficiencies are obtained.

It will be understood that my invention has equal application to apparatus other than dynamo-electric machines, as it is applicable in any case where the advantages of a double-entrance fan are desired but where air may be taken into the fan at one side of the fan assembly only.

Various changes may be made in the construction of my invention without departure from its spirit and scope, as defined in the appended claims, and it is intended, therefore, that the illustrated structure be taken as suggestive, merely, and not as limiting my claims exclusively thereto.

I claim as my invention:

1. In a dynamo-electric machine, a ventilating system comprising a double-entry fan, and means in combination with said fan for performing a duo-function of supplying air to the inner half of said fan and of effectively expanding the air leaving said fan, said means comprising a hollow-bladed diffuser, of which the hollow blades direct air axially and also direct the air discharged from the outer periphery of said fan.

2. In a dynamo-electric machine, a ventilating system comprising means for providing the utilization of a double-entry fan, the air being passed longitudinally through said means to the inner half of said fan, said means comprising a hollow-bladed diffuser, of which the hollow blades direct air axially and also direct the air discharged from the outer periphery of said fan.

3. In a dynamo-electric machine, a ventilating system comprising a fan, a diffuser cooperating with said fan and having hollow blades, and an inner wall plate carried by said diffuser for directing the air entering longitudinally through the hollow entrance of said blades to the inner side of said fan.

4. In a dynamo-electric machine, a ventilating system comprising a fan, a diffuser cooperating with said fan and having hollow blades, and an inner wall plate carried by said diffuser for directing the air entering longitudinally through the hollow entrance of said blades to the inner side of said fan, and means for supporting said plate near to its inner periphery.

5. In combination with a machine having a stator and a rotor, a fan carried by the rotor shaft and spaced axially from the end of the main portion of the rotor, and a diffuser carried by said stator by which the loss of energy due to high velocities leaving the fan which would otherwise occur, is recovered by expansion action, characterized by the fact that axial and radial air passages are provided for carrying air axially inwardly at a point or points beyond the outer periphery of the fan and then radially inwardly to the vicinity of the shaft and the inner periphery of the fan.

6. In combination with a machine having a stator member and a rotor member having a ventilating passage, a fan carried by the rotor shaft and spaced axially from the end of the rotor member, a diffuser for said fan carried by said stator and comprising hollow blades, an inner wall plate surrounding the rotor shaft, and means whereby a portion of the air passing through said hollow blades may enter the ventilating passage of said rotor.

7. In combination, a shaft, a plurality of fan blades supported in an annular ring spaced from the shaft, whereby air is drawn into the inner periphery of the fan blades, near the shaft and expelled from the outer periphery, an end-bell extending from the fan blades around over the fan, in spaced relation to the outer periphery thereof, for directing the air into channels where it is desired, the construction being such that all of the air must come to the fan from the outer side of said end-bell, said end-bell being provided with two inlets for the air coming into the inner periphery of the fan, one of said inlets being a central opening whereby a stream of air can enter the inner periphery of the fan axially from the outside, between the shaft and said inner periphery, and the other of said inlets being a series of openings disposed in a circle of larger diameter than the outer periphery of said fan blades, a diffuser being provided, having hollow blades opening, on one side, into the aforesaid circle of openings in said end-bell, and air-guiding means, on the other or inner side, for directing, towards the shaft, the air which enters through said hollow diffuser blades, so that a second stream of air can enter the fan axially from the inside, between the shaft and the inner periphery of the fan blades.

In testimony whereof, I have hereunto subscribed my name this first day of December, 1928.

MALCOLM D. ROSS.